M. HAHN & G. MAYERS.
NUT-LOCK.
No. 191,139. Patented May 22, 1877.
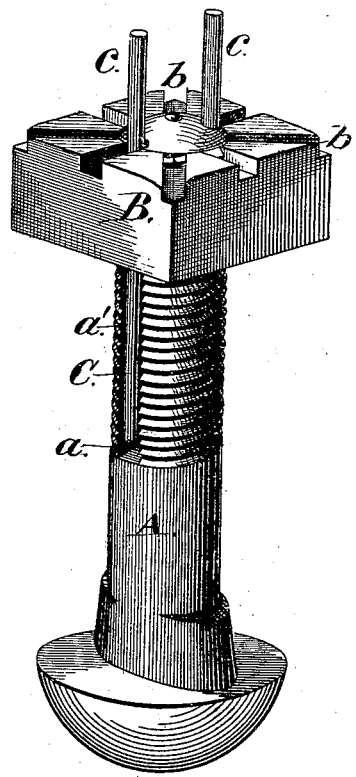
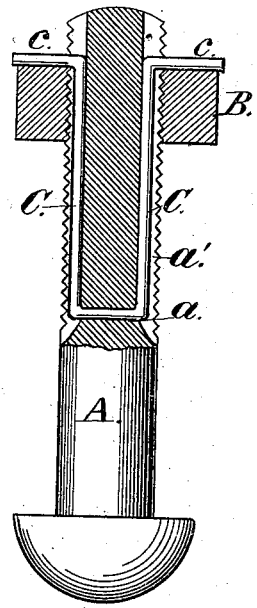
ATTEST.
Chas Hall,
L. Bland Purdett.
INVENTORS.
Michael Hahn
George Mayers.
By Knight Bro.
Attys.

UNITED STATES PATENT OFFICE.

MICHAEL HAHN AND GEORGE MAYERS, OF ST. LOUIS, MISSOURI.

IMPROVEMENT IN NUT-LOCKS.

Specification forming part of Letters Patent No. 191,139, dated May 22, 1877; application filed May 2, 1877.

*To all whom it may concern:*

Be it known that we, MICHAEL HAHN and GEORGE MAYERS, both of the city of St. Louis, in the State of Missouri, have invented a certain new and useful Improvement in Nut-Locks, of which the following is a full, clear, and exact description, reference being had to the accompanying drawings, making part of this specification.

Our improvement consists in forming a longitudinal groove or key-seat on each side of the bolt, extending as far from the point as the nut will be screwed onto the bolt, and connecting these grooves at the inner ends by a hole which passes diametrically through the the bolt, to receive a wire whose ends are bent around into the grooves. The wires are of sufficient length to extend past the face of the nut when it is screwed on, and hold the same from turning on the bolt by being bent outward into radial grooves formed in the face of the nut.

In the drawings, which represent our improvement applied to a fish-plate bolt, Figure 1 is a perspective view, showing the nut in position upon the bolt, but the locking-wire not yet forced down so as to lock the nut. Fig. 2 is an axial section, showing the nut locked upon the bolt. A is the bolt and B the nut.

A is a hole passing transversely through the bolt to receive a wire, C, whose ends are bent around to the bolt and occupy grooves or key-seats $a'$, made longitudinally in the sides of the bolt and extending from the hole $a$ to the point of the bolt. The wire C has sufficient length for its ends to extend beyond the outer face of the nut B, when the nut is screwed into place; and to lock the nut, the ends $c$ of the wire are bent outward and occupy radial grooves $b$ in the face of the nut so as to prevent it from being unscrewed by any amount of shaking to which it may be subjected.

This device is applicable to nuts in any place or position, and is both cheap and reliable.

The grooves $a'$ and $b$ in the bolt and nut may be made by stamping before the screws are cut.

We claim as our invention—

In combination with a bolt and nut, the wire or rod C, passing through the bolt and occupying grooves $a'$ and $b$ in the bolt and nut, respectively.

MICHAEL HAHN.
GEORGE MAYERS.

Witnesses:
SAM. KNIGHT,
GEORGE D. KNIGHT.